United States Patent
Arimilli et al.

(10) Patent No.: US 6,826,655 B2
(45) Date of Patent: *Nov. 30, 2004

(54) APPARATUS FOR IMPRECISELY TRACKING CACHE LINE INCLUSIVITY OF A HIGHER LEVEL CACHE

(75) Inventors: Ravi Kumar Arimilli, Austin, TX (US); Guy Lynn Guthrie, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 254 days.

This patent is subject to a terminal disclaimer.

(21) Appl. No.: 10/216,632

(22) Filed: Aug. 8, 2002

(65) Prior Publication Data

US 2004/0030950 A1 Feb. 12, 2004

(51) Int. Cl.[7] .............................................. G06F 12/08
(52) U.S. Cl. ...................................... 711/141; 711/122
(58) Field of Search ................................. 711/141, 122

(56) References Cited

U.S. PATENT DOCUMENTS

2002/0152359 A1 * 10/2002 Chaudhry et al. .......... 711/141

* cited by examiner

Primary Examiner—Kevin Verbrugge
Assistant Examiner—Midys Inoa
(74) Attorney, Agent, or Firm—Casimer K. Salys; Dillon & Yudell LLP

(57) ABSTRACT

A symmetric multiprocessor data processing system having an apparatus for imprecisely tracking cache line inclusivity of a higher level cache is disclosed. The symmetric multiprocessor data processing system includes multiple processing units. Each of the processing units is associated with a level one cache memory. All the level one cache memories are associated with an imprecisely inclusive level two cache memory. The imprecisely inclusive level two cache memory includes a tracking means for imprecisely tracking cache line inclusivity of the level one cache memories. The tracking means includes a last_processor_to_store field and a more_than_two_loads field per cache line. When the more_than_two_loads field is asserted, except for a specific cache line in the level one cache memory associated with the processor indicated in the last_processor_to_store field, all cache lines within the level one cache memories that shared identical information with that specific cache line are invalidated.

8 Claims, 3 Drawing Sheets

APPARATUS FOR IMPRECISELY TRACKING CACHE LINE INCLUSIVITY OF A HIGHER LEVEL CACHE

RELATED PATENT APPLICATIONS

The present patent application is related to copending applications:

1. U.S. Ser. No. 10/216,630, filed on even date, and
2. U.S. Ser. No. 10/216,637, filed on even date.

All above-mentioned copending applications are assigned to the assignee of the present application, and the content of each is hereby incorporated herein by reference.

BACKGROUND OF THE INVENTION

1. Technical Field

The present invention relates to a data processing system in general, and in particular to a data processing system having a cache memory hierarchy. Still more particularly, the present invention relates to an apparatus for imprecisely tracking cache line inclusivity of a higher level cache.

2. Description of the Related Art

Broadly speaking, all processing units within a symmetric multiprocessor (SMP) data processing system are generally identical. In other words, all of the processing units within an SMP data processing system generally have the same architecture and utilize a common set or subset of instructions and protocols to operate. Each processing unit within the SMP data processing system includes a processor core having multiple registers and execution units for carrying out program instructions. The SMP data processing system may also include a cache memory hierarchy.

A cache memory hierarchy is a cache memory system consisting of several levels of cache memories, each level having a different size and speed. Typically, the first level cache memory, commonly known as the level one (L1) cache, has the fastest access time and the highest cost per bit. The remaining levels of cache memories, such as level two (L2) caches, level three (L3) caches, etc., have a relatively slower access time, but also a relatively lower cost per bit. It is quite common that each lower cache memory level has a progressively slower access time and a larger size.

Within a cache memory hierarchy, when multiple L1 caches share a single L2 cache, the L2 cache is typically inclusive of all the L1 caches. Thus, the L2 cache has to maintain a dedicated inclusivity bit per L1 cache in an L2 directory for each L1 cache line. Consequently, the L2 directory, which is a costly resource, grows substantially as the total number of L1 cache lines increases. As a result, the additional inclusivity bit information in the L2 directory leads to a relatively large L2 cache design with relatively slow access time to the L2 directory. The present disclosure provides an improved inclusivity tracking apparatus to solve the above-mentioned problem.

SUMMARY OF THE INVENTION

In accordance with a preferred embodiment of the present invention, a symmetric multiprocessor data processing system includes multiple processing units. Each of the processing units is associated with a level one cache memory. All the level one cache memories are associated with an imprecisely inclusive level two cache memory. The imprecisely inclusive level two cache memory includes a tracking means for imprecisely tracking cache line inclusivity of the level one cache memories. Thus, the level two cache memory does not have dedicated inclusivity bits for tracking the cache line inclusivity of each of the associated level one cache memories. The tracking means includes a last_processor_to_store field and a more_than_two_loads field per cache line. When the more_than_two_loads field is asserted, except for a specific cache line in the level one cache memory associated with the processor indicated in the last_processor_to_store field, all cache lines within the level one cache memories that shared identical information with that specific cache line are invalidated.

All objects, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

For the purpose of illustration, the present invention is demonstrated using a symmetric multiprocessor (SMP) data processing system having three levels of cache memory. However, it should be understood that the features of the present invention may be applicable in any data processing system having multiple levels of cache memory.

I. Prior Art

Figure 1:
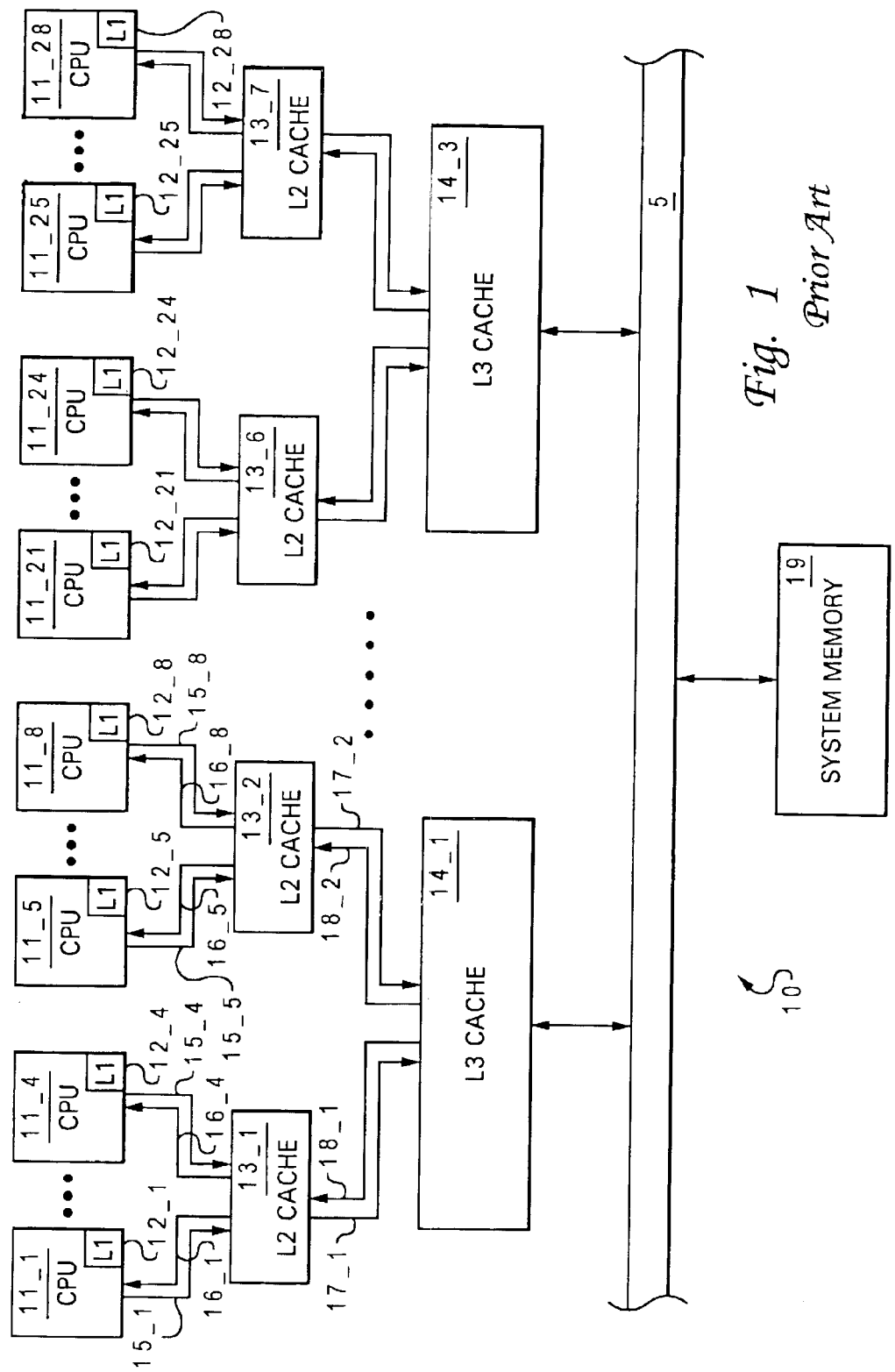
FIG. 1 is a block diagram of a symmetric multiprocessor data processing system according to the prior art.

Referring now to the drawings and, in particular, to FIG. 1, there is depicted a block diagram of an SMP data processing system, according to the prior art. As shown, a SMP data processing system 10 includes multiple central processing units (CPUs) 11_1–11_28, and each of CPUs 11_1–11_28 contains a level one (L1) cache. Further, CPU 11_1 contains an L1 cache 12_1, CPU 11_2 contains an L1 cache 12_2, etc. Each of CPUs 11_1–11_28 (including L1 caches 12_1–12_28) is coupled to a respective one of level two (L2) caches 13_1–13_7. Similarly, each of L2 caches 13_1–13_7 is coupled to a respective one of level three (L3) caches 14_1–14_3.

The lowest memory level for SMP data processing system 10 is a system memory 19. CPUs 11_1–11_28, L1 caches 12_1–12_28, L2 caches 13_1–13_7, and L3 caches 14_1–14_3 are coupled to system memory 19 via an interconnect 5. Interconnect 5 serves as a conduit for communication transactions between L3 caches 14_1–14_3 and other snoopers coupled to interconnect 5.

In the prior art cache memory hierarchy, as shown in FIG. 1, L2 caches 13_1–13_7 are all inclusive of their associated L1 caches. For example, L2 cache 13_1 is inclusive of L1 caches 12_1–12_4, and L2 cache 13_2 is inclusive of L1 caches 12_5–12_8. L2 cache 13_1 communicates with L1 caches 12_1–12_4 via a respective one of load/store request lines 15_1–15_4 and a respective one of L1 inclusivity lines 16_1–16_4. L2 cache 13_2 communicates with L1 caches 12_5–12_8 via a respective one of load/store request lines 15_5–15_8 and a respective one of L1 inclusivity lines 16_5–16_8. Similarly, L3 cache 14_1–14_3 are all inclusive of their associated L2 caches. For example, L3 cache 14_1 is inclusive of L2 caches 13_1–13_2, and L3 cache 14_3 is inclusive of L2 caches 13_6–13_7. L3 cache 14_1 communicates with L2 caches 13_1–13_2 via a respective one of load/store request lines 17_1–17_2 and a respective one of L1 inclusivity lines 18_1–18_2.

II. Imprecisely Inclusive L2 Cache Structure

Figure 2:
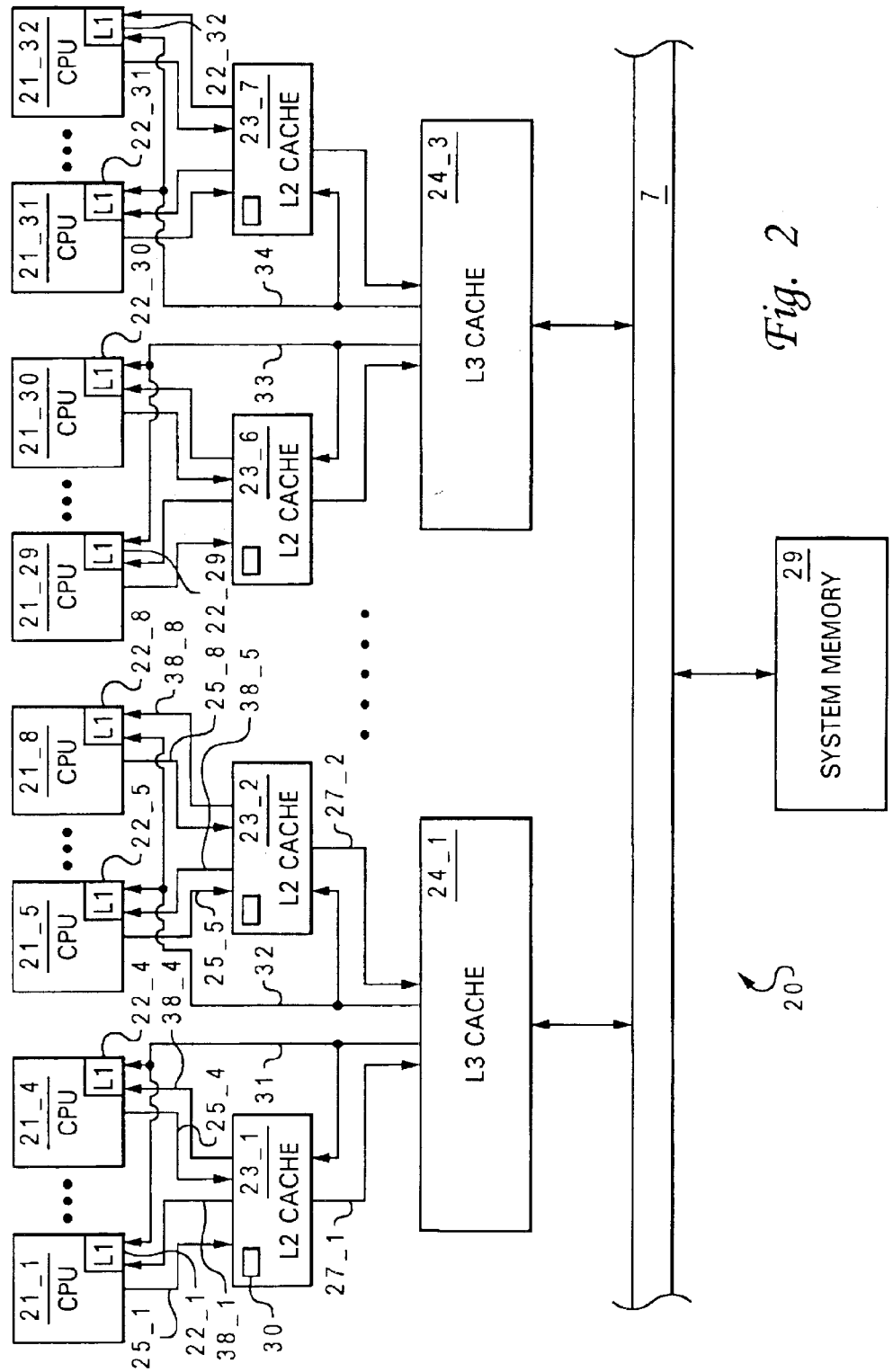
FIG. 2 is a block diagram of a symmetric multiprocessor data processing system in which a preferred embodiment of the present invention is incorporated.

With reference now to FIG. 2, there is depicted a block diagram of an SMP data processing system in which a preferred embodiment of the present invention is incorporated. As shown, a data processing system 20 includes multiple CPUs 21_1–21_32, and each of CPUs 21_1–21_32 contains a L1 cache. Further, CPU 21_1 contains an L1 cache 22_1, CPU 21_2 contains an L1 cache 22_2, etc. Each of CPUs 21_1–21_32 (including L1 caches 22_1–22_32) is coupled to a respective one of L2 caches 23_1–23-7. Similarly, each of L2 caches 23_1–23_7 is coupled to a respective one of L3 caches 24_1–24_3.

CPUs 21_1–21_32, L1 caches 22_1–22_32, L2 caches 23_1–23_7, and L3 caches 24_1–24_3 are coupled to a system memory 29 via an interconnect 7. Interconnect 7, which can be either a bus or a cross-point switch, serves as a conduit for communication transactions between L3 caches 24_1–24_3 and other snoopers coupled to interconnect 7. A typical transaction on interconnect 7 begins with a request, which may include a transaction field indicating the type of transaction, source and destination tags indicating the source and intended recipient(s) of the transaction, respectively, and an address and/or data. Each component connected to interconnect 7 preferably snoops all transactions on interconnect 7 and, if appropriate, responds to the request with a snoop response.

Each succeeding lower level from L1 caches 22_1–22_32 of the cache memory hierarchy is capable of storing a larger amount of information than upper levels, but at a higher access latency. For example, L1 caches 22_1–22_32 may each have 256 cache lines, each cache line being 128 byte, for a total storage capacity of 32 kilobytes, all at a single cycle latency. L2 caches 23_1–23_7 may each have 16,384 (16 k) cache lines, each cache line being 128 byte, for a total storage capacity of 2 megabytes, all at a latency of approximately 10 cycles. L3 caches 24_1–24_3 may each have 2,684,354 (256 k) cache lines, each cache line being 128 byte, for a total storage capacity of 32 megabytes, all at a latency of approximately 70 cycles. Finally, system memory 29 can store hundreds of gigabytes of data at a latency of at least 300 cycles. Given the large disparity in access latencies between the various levels of memories within the memory hierarchy, it is advantageous to reduce the frequency of access to lower levels of memories within the memory hierarchy, especially system memory 29.

Those skilled in the art will appreciate that data processing system 20 can include many additional components, such as bus bridges, input/output devices, non-volatile storage devices, ports for connection to networks, etc. Because those additional components are not necessary for understanding the present invention, they are not illustrated in FIG. 2 or discussed further herein. Although a preferred embodiment of an SMP data processing system is depicted in FIG. 2, it should be understood that the present invention can be implemented in a variety of data processing systems having a cache memory hierarchy.

In order to obtain valid execution results in data processing system 20, a single view of the contents of memory must be provided to all of CPUs 21_1–21_32 by maintaining a coherent cache memory hierarchy. A coherent cache memory hierarchy is maintained through the implementation of a cache memory coherency protocol, such as the conventional MESI protocol. According to the MESI protocol, an indication of a coherency state is stored in association with each coherency granule (such as a cache line or sector) of at least all upper level memories. Each coherency granule can have one of four states: Modified (M), Exclusive (E), Shared (S), or Invalid (I), which is typically indicated by two bits in a cache directory. The Modified state indicates that a coherency granule is valid only in the cache memory storing the modified coherency granule and that the value of the modified coherency granule has not been written to (i.e., is inconsistent with) system memory 29. When a coherency granule is indicated as Exclusive, the coherency granule is resident in, of all cache memories at that level of the cache memory hierarchy, only the cache memory having the coherency granule in the Exclusive state. The data in the Exclusive state is consistent with system memory 29, however. If a coherency granule is marked as Shared in the cache directory, the coherency granule is resident in the associated cache and may also be in other caches at the same level of the cache memory hierarchy, all of the copies of the coherency granule being consistent with system memory 29. Finally, the Invalid state generally indicates that the data and address tag associated with a coherency granule are both invalid.

The state to which each coherency granule is set can be dependent upon a previous state of the cache line, the type of memory access sought by processors to the associated memory address, and the state of the coherency granule in other caches. Accordingly, maintaining cache coherency within data processing system 20 requires that CPUs 21_1–21_28 communicate messages across interconnect 7 indicating an intention to read or write memory locations. For example, when a CPU requires data not resident in its associated cache memory or memories, the CPU may issue a LOAD request on interconnect 7 specifying a particular memory address. The LOAD request is interpreted by its recipients as a request for only a single coherency granule in the lowest level cache in the CPU. The requested cache data is then provided to the requestor by a recipient determined by the coherency protocol, and the requestor typically caches the data in one of the valid states (i.e., M, E, or S) because of the probability that the cache line will again be accessed shortly.

With the present architecture, L2 caches 23_1–23_7 all maintain imprecise inclusivity in their associated L1 caches. For example, L2 cache 23_1 maintain imprecise inclusivity in L1 caches 22_1–22_4, L2 cache 23_2 maintains imprecise inclusivity in L1 caches 22_5–22_8, etc. L3 caches 24_1–24_3 may be all inclusive or all non-inclusive of their associated L2 caches. However, it is preferable that L3 caches 24_1–24_3 to be inclusive such that L3 caches 24_1–24_3 can serve as filters for filtering all the information to and from interconnect 7. In the present embodiment, L3 cache 24_1 is inclusive of L2 caches 23_1–23_2, L3 cache 24_3 is inclusive of L2 caches 23_6–23_7, etc.

Each of L1 caches 22_1–22_4 communicates its LOAD or STORE requests (from a respective processor) with L2 cache 23_1 via a respective one of load/store request lines 25_1–25_4. Each of L1 caches 22_5–22_8 communicates its LOAD or STORE requests with L2 cache 23_2 via a respective one of load/store request lines 25_5–25_8. Similarly, each of L2 caches 23_1–23_2 communicates its LOAD or STORE requests with L3 cache 24_1 via a respective one of load/store request lines 27_1–27_2.

III. L1/L2 Cache Invalidate Bus

In addition, an L1/L2 cache invalidation bus is coupled between an L3 cache and each of the associated L1 and L2 caches. For example, an L1/L2 cache invalidation bus 31 is coupled between L3 cache 24_1 and each of L1 caches 22_1–22_4 and L2 cache 23_1; and an L1/L2 cache invalidation bus 32 is coupled between L3 cache 24_1 and each of L1 caches 22_5–22_8 and L2 cache 23_2. L1/L2 cache invalidation bus 31 is "seen" by L1 caches 22_1–22_4 and L2 cache 23_1. Similarly, L1/L2 cache invalidation bus 32 is "seen" by L1 caches 22_5–22_8 and L2 cache 23_2. L1/L2 cache invalidation buses 31 and 32 carry invalidation information that L3 cache 24_1 snoops from interconnect 7. Because the L1 and L2 caches are aware of the invalidation information (due to STORE operations by, for example, a processor) that the L3 cache snoops from interconnect 7, the L2 caches do not have to manage the task of informing their associated L1 caches of the invalidation information obtained from interconnect 7. Other L1/L2 cache invalidation buses shown in FIG. 2 are L1/L2 cache invalidation buses 33 and 34.

The topology of L1/L2 cache invalidation buses 31–34 can be multi-dropped, as shown in FIG. 2, or daisy-chained among multiple caches. For example, L1/L2 cache invalidation bus 31 may be connected to L1 caches 22_1–22_4 in a daisy-chained manner. Each of L1/L2 cache invalidation buses 31–34 includes one Invalidation_Val line and several Invalidation_Addr lines. For a 128-byte cache line address in the present embodiment, Invalidation_Addr lines are preferably 57 bits wide. For example, 0–56 bits of the Invalidation_Addr lines may specify the cache line address in a data processing system where the a byte address is defined as 64-bit wide. Invalidation_Val line is a signal line for indicating whether or not a cache invalidation is valid.

During operation, if a processor, such as CPU 21_5, would like to perform a STORE operation on a cache line in its L1 cache 22_5 and the cache line is either in a Shared or Invalid state (i.e., not in a Modified or Exclusive state), then L3 cache 24_1 would be aware of such information by, for example, detecting the STORE operation on load/store request line 27_2. In response, L3 cache 24_1 places the invalidation address on the Invalidation_Addr lines of L1/L2 cache invalidation bus 31 (invalidations of L1 caches 22_6–22_8 are performed by L2 cache 23_2 via local invalidation buses 38_5–38_8, as will be described in details later), and sets one of the corresponding Invalidation_Val line of L1/L2 cache invalidation bus 31 valid. If L3 cache 24_1 has the cache line either in a Shared or Invalid state (i.e., not in a Modified or Exclusive state), L3 cache 24_1 must notify other L3 caches, such as L3 cache 24_3, by sending a request (such as a RWITM or DClaim request) on interconnect 7. Because L1/L2 cache invalidation buses 31 and 32 are non-blocking (i.e., cannot be retried or the request must be completed within a fixed number of processor cycles), L1 and L2 cache lines that were in a Shared state with the cache line that the STORE operation has been performed are invalidated simultaneously within the next processor cycle.

IV. Imprecise Inclusivity Tracking Apparatus

In the prior art, typically two L2 cache directory bits (known as MESI bits) are used to implemented a MESI cache coherency protocol for an inclusive L2 cache, and one L2 cache directory bit (known as inclusivity bit) is used to track the inclusivity of a cache line in the L1 cache. In the present embodiment, L2 caches are imprecisely inclusive, and an optimally acceptable level of inclusivity information is maintained without incurring too much access time and space penalty such as having inclusivity bits in the L2 directories on a per L1 cache basis as is done in a conventional inclusive L2 cache. Specifically, in accordance with a preferred embodiment of the present invention, an imprecise inclusivity tracking apparatus is used to imprecisely track the inclusivity of the cache lines in the L1 caches for the purpose of invalidating cache lines in the Li caches. As shown in FIG. 2, an imprecise inclusivity tracking apparatus 30 is located within a cache directory (not shown) of L2 cache 23_1. Imprecise inclusivity tracking apparatus 30 preferably includes four fields per cache line, with each field being at least one bit wide.

Figure 3:
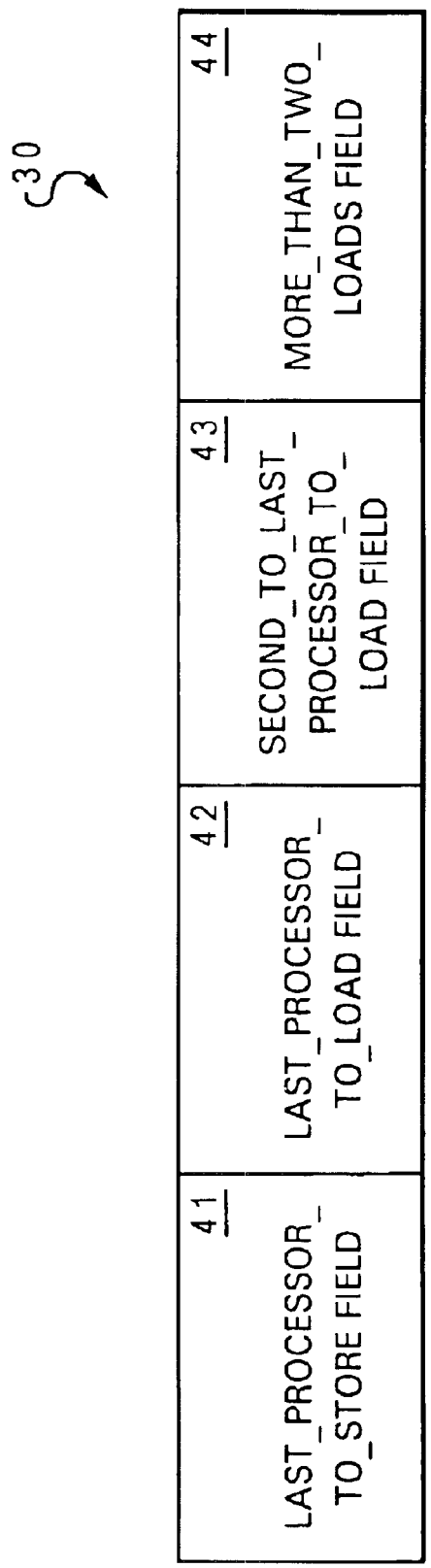
FIG. 3 is a block diagram of an imprecise inclusivity tracking apparatus in accordance with a preferred embodiment of the present invention.

With reference now to FIG. 3, there is depicted a block diagram of imprecise inclusivity tracking apparatus 30, in accordance with a preferred embodiment of the present invention. As shown, imprecise inclusivity tracking apparatus 30 includes a last_processor_to_store field 41, a last_processor_to_load field 42, a second_to_last_processor_to_load field 43, and a more_than_two_loads field 44 for each cache line in the L2 directory. Last_processor_to_store; field 41 indicates the processor identification (ID) of the last processor that has made a STORE request to a specific cache line. Last_processor_to_store field 41 may be implemented by two ID bits for storing a processor ID (for a total of four processors). After the STORE request has been received by the L2 cache, the processor ID of the processor that made the STORE request to the specific cache line is loaded in last_processor_to_store field 41. Last_processor_to_load field 42 indicates the last processor that has made a LOAD request to a specific cache line. Last_processor_to_load field 42 may be implemented by two ID bits for storing a processor ID (for a total of four processors) and one valid bit. After the LOAD request has been received by the L2 cache, the processor ID of the processor that made the LOAD request to the specific cache line is stored in last_processor_to_load field 42, and the valid bit is set.

Second_to_last_processor_to_load field 43 indicates the second to last processor that has made a LOAD request to a specific cache line. Second_to_last_processor_to_load field 43 may be implemented by two ID bits for storing a processor ID (for a total of four processors) and one valid bit. After the second LOAD request (consecutive to the above-mentioned first LOAD request) has been received by the L2 cache, the processor ID of the processor that made the second LOAD request to the specific cache line is stored in second_to_last_processor_to_load field 43, and the valid bit is set.

More_than_two_loads field 44 indicates more than two LOAD requests have occurred since the last STORE request to a specific cache line. More_than_two_loads field 44 may be implemented by one bit. After a third LOAD request (consecutive to the above-mentioned first and second LOAD requests) has been received by the L2 cache, more_than_two_loads field 44 is set.

The functions of last_processor_to_store field 41, last_processor_to_load field 42, second_to_last_processor_to_load field 43, and more_than_two_loads field 44 can be illustrated with an example shown in Table I.

Assuming there are eight processors, namely, P0 through P7 in an SMP data processing system, and each of the processors P0–P7 has its own L1 cache. During the initial state, processor ID P0 is stored in last_processor_to_store field 41. After processor 5 has made a STORE request, processor ID P5 is stored in last_processor_to_store field 41, and the corresponding cache line in the L1 cache associated with processor 0 is invalidated. After processor 7 has made a STORE request, processor ID P7 is stored in last_processor_to_store field 41, and the corresponding cache line in the L1 cache associated with processor 5 is invalidated. After processor 2 had made a LOAD request, processor ID P2 is stored in last_processor_to_load field 42. After processor 3 has made a LOAD request, processor ID P3 is stored in last_processor_to_load field 42, and processor ID P2 is stored in second_to_last_processor_to_load field 43. After processor 6 made a STORE request, processor ID P6 is stored in last_processor_to_store field 41, and the corresponding cache lines in the L1 cache associated with processors 2, 3, and 7 are invalidated. After processor 2 has made a LOAD request, processor ID P2 is stored in last_processor_to_load field 42. After processor 3 has made a LOAD request, processor ID P3 is stored in last_processor_to_load field 42, and processor ID P2 is stored in second_to_last_processor_to_load field 43. After processor 4 has made a LOAD request, processor ID P4 is stored in last_processor_to_load field 42, processor ID P3 is stored in second_to_last_processor_to_load field 43, and more_than_two_loads field 44 is set. After processor 1 has made a STORE request, processor ID P1 is stored in last_processor_to_store field 41, and the corresponding cache lines in the L1 caches associated with all processors except processor 1 (i.e., processors 0 and 2–7) are invalidated.

TABLE I

| sequence | field 41 | field 42 | field 43 | field 44 | L1 cache line invalidation action |
|---|---|---|---|---|---|
| initial state | P0 | | | | none |
| P5 store | P5 | | | 0 | invalidate L1 cache line in P0 |
| P7 store | P7 | | | 0 | invalidate L1 cache line in P5 |
| P2 load | P7 | P2 | | 0 | none |
| P3 load | P7 | P3 | P2 | 0 | none |
| P6 store | P6 | x | x | 0 | invalidate L1 cache lines in P2, P3, P7 |
| P2 load | P6 | P2 | | 0 | none |
| P3 load | P6 | P3 | P2 | 0 | none |
| P4 load | P6 | P4 | P3 | 1 | none |
| P1 store | P1 | x | x | 0 | invalidate L1 cache lines in all but P1 |

The invalidation is preferably performed by a non-blocking local invalidation buses connected between each L2 cache and the associated L1 caches. For example, in FIG. 2, local invalidation bus 38_1 is connected between L1 cache 22_1 and L2 cache 23_1; local invalidation bus 38_4 is connected between L1 cache 22_4 and L2 cache 23_1; local invalidation bus 38_5 is connected between L1 cache 22_5 and L2 cache 23_2; local invalidation bus 38_8 is connected between L1 cache 22_8 and L2 cache 23_2, etc. The invalidations sent on local invalidate bus 38_1–38_4 are the result of STORE operations "seen" by L2 cache 23_1 on its local CPUs 21_1–21_4 via load/store request lines 25_1–25_4. Invalidations sent on L1/L2 cache invalidation bus 31 (to L1 caches 22_1–22_4 and L2 cache 23_1) are the result of STORE operations L3 cache 24_1 "sees" from all non-local CPUs (CPUs 21_5–21_32) via load/store request lines 27_2 and interconnect 7.

In the present preferred embodiment, the threshold of using non-blocking local invalidation buses to perform a "global" cache line invalidation on the corresponding L1 cache lines is three consecutive LOAD operations on three different processors. In other words, any STORE request after three consecutive LOAD operations on three different processors (i.e., more_than_two_loads field 44 is set) will trigger the non-blocking local invalidation buses to invalidate all the corresponding L1 cache lines in the associated processors except the processor from which the STORE request is made. The threshold number of three is determined empirically; however, it is understood by those skilled in the art that the threshold number can be changed depending on the size of the system and the type of data on which the system is operated.

As has been described, the present invention provides an imprecise inclusivity tracking apparatus for imprecisely tracking cache line inclusivity of a higher level cache. The imprecise inclusivity tracking apparatus consumes relatively less space in an L2 directory than the conventional inclusivity bits. As such, the latency and size of the L2 directory will be not dramatically increased as the number of L1 caches grows. With the present invention, the cache structure scales better as the number of L1 and L2 caches begin to increase because the size of the corresponding L2 directory is not affected too much by the number of the associated L1 caches.

While the invention has been particularly shown and described with reference to a preferred embodiment, it will be understood by those skilled in the art that various changes in form and detail may be made therein without departing from the spirit and scope of the invention.

What is claimed is:

1. A data processing system, comprising:
    a plurality of processing units;
    a plurality of high level cache memories, wherein ones of said plurality of high level cache memories are associated with respective ones of said plurality of processing units;
    a lower level cache memory associated with said plurality of high level cache memories, wherein said lower level cache memory is imprecisely inclusive of said plurality of level one cache memories; and
    an imprecise inclusivity tracking means coupled to said lower level cache memory for tracking cache line inclusivity of said high level cache memories, wherein said imprecise inclusivity tracking means associates with lower lever cache lines last_processor_to_store information and more_than_two_loads information to selectively invalidate cache lines in said high level cache memories that shared identical information with a specific cache line, as identified by said last_processor_to_store information, within said lower level cache memory.

2. The data processing system of claim 1, wherein said plurality of high level cache memories are non-blocking cache memories that do not allow retry operations.

3. The data processing system of claim 1, wherein said imprecise inclusivity tracking means further includes a last_processor_to_load field and a second_to_last_processor_to_load field.

4. The data processing system of claim 1, wherein said imprecise inclusivity tracking means is included within a directory of said level two cache memory.

5. A method for imprecisely tracking cache line inclusivity of a cache memory in a multi-level memory hierarchy within a data processing system having a plurality of processing units, said method comprising:
    associating a high level cache memory with a respective one of said plurality of processing units;
    associating a lower level cache memory with said plurality of level one cache memories, wherein said level two cache memory is imprecisely inclusive of said plurality of level one cache memories;

providing an imprecise inclusivity tracking means coupled to said lower level cache memory for tracking cache line inclusivity of said high level cache memories, wherein said imprecise inclusivity tracking means associates with lower lever cache lines last_processor_to_store information and more_than_two_loads information to selectively invalidate cache lines in said high level cache memories that shared identical information with a specific cache line, as identified by said last_processor_to_store information, within said lower level cache memory.

6. The method of claim 5, wherein said plurality of high level cache memories are non-blocking cache memories that do not allow retry operations.

7. The method of claim 5, wherein said method further includes providing a last_processor_to_load field and a second_to_last_processor_to_load field within said imprecise inclusivity tracking means.

8. The method of claim 5, wherein said method further includes providing said imprecise inclusivity tracking means in a directory of said lower level cache memory.

* * * * *